US012000252B2

(12) United States Patent
Riedel, Jr. et al.

(10) Patent No.: US 12,000,252 B2
(45) Date of Patent: Jun. 4, 2024

(54) HYDRAULIC FRACTURING SYSTEM WITH MULTIPLE TRAILER-MOUNTED FRACTURING MANIFOLDS

(71) Applicant: SPM Oil & Gas Inc., Fort Worth, TX (US)

(72) Inventors: Robert E. Riedel, Jr., Wake Forest, NC (US); Peter A. Manos, McHenry, IL (US)

(73) Assignee: SPM Oil & Gas Inc., Fort Worth, TX (US)

( * ) Notice: Subject to any disclaimer, the term of this patent is extended or adjusted under 35 U.S.C. 154(b) by 220 days.

(21) Appl. No.: 17/538,779

(22) Filed: Nov. 30, 2021

(65) Prior Publication Data
US 2023/0167726 A1 Jun. 1, 2023

(51) Int. Cl.
*E21B 43/26* (2006.01)
*B60P 3/00* (2006.01)
*B62D 21/02* (2006.01)

(52) U.S. Cl.
CPC ............ *E21B 43/2607* (2020.05); *B60P 3/00* (2013.01); *B62D 21/02* (2013.01)

(58) Field of Classification Search
CPC ........ E21B 43/2607; E21B 43/26; B60P 3/00; B62D 21/02; B62D 21/20
See application file for complete search history.

(56) References Cited

U.S. PATENT DOCUMENTS

| | | | |
|---|---|---|---|
| 10,480,300 B2 | 11/2019 | Guidry | |
| 10,662,749 B1 | 5/2020 | Hill et al. | |
| 10,982,523 B1* | 4/2021 | Hill | F16L 41/021 |
| 2012/0181013 A1* | 7/2012 | Kajaria | E21B 43/26 |
| | | | 166/79.1 |
| 2017/0122060 A1* | 5/2017 | Dille | E21B 33/068 |
| 2017/0314379 A1* | 11/2017 | Guidry | E21B 43/26 |
| 2018/0187537 A1* | 7/2018 | Hill | F16L 41/008 |
| 2020/0277845 A1 | 9/2020 | Kajaria | |
| 2021/0148500 A1* | 5/2021 | Farquharson | F16L 39/02 |
| 2022/0018235 A1* | 1/2022 | Post | F16L 27/0824 |
| 2022/0145733 A1* | 5/2022 | Massey | E21B 43/12 |
| 2022/0356976 A1* | 11/2022 | Cook | E21B 43/2607 |
| 2023/0053422 A1* | 2/2023 | Cook | E21B 43/2607 |
| 2023/0107300 A1* | 4/2023 | Huang | F17D 3/01 |
| | | | 137/597 |

FOREIGN PATENT DOCUMENTS

WO WO-2022256415 A1 * 12/2022 ......... E21B 43/2607

OTHER PUBLICATIONS

"Efficiently handle high-pressue frac operatons without traditional iron", nov.com/anson, anson@nov.com. © 2020 National Oilwell Varco. All rights reserved. 2535 v06., 2 pages.

* cited by examiner

*Primary Examiner* — James G Sayre
(74) *Attorney, Agent, or Firm* — Lee & Hayes, P.C.

(57) ABSTRACT

A fracturing system includes a first trailer-mounted fracturing manifold including a plurality of first fluidly-connected junctions and a second trailer-mounted fracturing manifold including a plurality of second fluidly-connected junctions. A flexible conduit fluidly connects an initial junction of the first junctions to a terminal junction of the second junctions to place the first trailer-mounted fracturing manifold in series connection with the second trailer-mounted fracturing manifold.

18 Claims, 4 Drawing Sheets

HYDRAULIC FRACTURING SYSTEM WITH MULTIPLE TRAILER-MOUNTED FRACTURING MANIFOLDS

TECHNICAL FIELD

The present disclosure relates to a hydraulic fracturing manifold. More specifically, the present disclosure relates to modular hydraulic fracturing manifolds that are configurable between multiple configurations.

BACKGROUND

Hydraulic fracturing is a well stimulation technique that typically involves pumping hydraulic fracturing fluid into a wellbore at a rate and pressure sufficient to form fractures in a rock formation surrounding the wellbore. This well stimulation technique often enhances the natural fracturing of a rock formation in order to increase the permeability of the rock formation, thereby improving recovery of water, oil, natural gas, and/or other fluids. In order to fracture such rock formations, the hydraulic fracturing fluid is injected into the wellbore at pressures and rates sufficient to exceed a fracture gradient of the target formation. In some conventional arrangements, a series of pumps is used to pressurize the hydraulic fracturing fluid. A fracturing manifold receives the pressurized hydraulic fracturing fluid from the pumps and delivers the hydraulic fracturing fluid to an injection point (e.g., a frac tree) at the necessary pump rate.

In order to reduce setup and teardown times, fracturing manifolds are often transported between jobsites on trailers. However, trailers are limited by structural size and weight restrictions and by local government restrictions. Furthermore, current fracturing manifold trailers lack modularity in the number of junctions provided and the location of a fracturing head in a fracturing manifold system.

An example hydraulic fracturing manifold is described in U.S. Pat. No. 10,662,749 (hereinafter referred to as "the '749 reference"). In particular, the '749 reference describes a trailer-mounted hydraulic fracturing manifold. The trailer-mounted fracturing manifold includes a specific number of cross junctions that are mounted on the trailer and receive fracturing fluid from fracturing pumps. The '749 reference further describes modular arrangements in which a modular manifold is coupled to the trailer mounted fracturing manifold to provide additional cross junctions. In the '749 reference, the modular manifold must be accurately placed in close proximity to the trailer-mounted hydraulic fracturing manifold to facilitate fluid connection via a rigid conduit. However, the positioning and attachment of the modular manifold to the trailer-mounted hydraulic fracturing manifold is often difficult and time-consuming in a crowded fracturing site. Moreover, the modular manifold may be limited in its arrangement and may be difficult to move and orient.

Example embodiments of the present disclosure are directed toward overcoming the deficiencies described above.

SUMMARY

An example fracturing system includes a first trailer, a second trailer, and a flexible conduit. The first trailer includes first wheels for transporting the first trailer over a ground surface; a first trailer chassis extending from a first end to a second end, the first trailer chassis comprising a first junction mounting surface, extending from the first end toward the second end, the first wheels being disposed proximate the second end; and a plurality of first junctions fluidly connected via first rigid conduits and coupled to the first junction mounting surface, the plurality of first junctions including, in series, a first initial junction proximate the first wheels, at least one first intermediate junction, and a first terminal junction proximate the first end, the first initial junction, the at least one first intermediate junction, and the first terminal junction being connected via first rigid conduits. The second trailer includes a second trailer chassis extending from a third end to a fourth end, the second trailer chassis comprising a second junction mounting surface; and a plurality of second junctions fluidly connected via second rigid conduits and coupled to the second junction mounting surface, the plurality of second junctions including, in series, a second initial junction, at least one second intermediate junction, and a second terminal junction proximate the third end of the second trailer chassis, the second initial junction, the at least one second intermediate junction, and the second terminal junction being connected via second rigid conduits. The flexible conduit fluidly connects the first initial junction to the second terminal junction and is configured to convey fracturing fluid from the second terminal junction to the first initial junction to place the plurality of first junctions in series with the plurality of second junctions.

Another example fracturing system includes a first trailer, a second trailer, and a flexible conduit. The first trailer includes a first trailer chassis and a plurality of first junctions disposed on the first trailer chassis, the plurality of first junctions being connected in series via first rigid conduits and comprising a first initial j unction, at least one first intermediate junction, and a first terminal junction, individual of the plurality of first junctions being configured to receive fracturing fluid from a fracturing pump via a high-pressure flow line. The second trailer includes a second trailer chassis and one or more second junctions disposed on the second trailer, the one or more second junctions including a second terminal junction. The flexible conduit fluidly connects the first initial junction to the second terminal junction.

In a further example, an example method of configuring a fracturing system includes: providing a first trailer including a first trailer chassis and a plurality of first junctions arranged in series; aligning a second trailer with the first trailer, the second trailer including a second trailer chassis and a plurality of second junctions arranged in series; providing a flexible conduit; and coupling a first end of the flexible conduit to a terminal junction of the plurality of second junctions and a second end of the flexible conduit to an initial junction of the plurality of first junctions to place the plurality of first junctions in series with the plurality of second junctions.

DETAILED DESCRIPTION

This disclosure generally relates to improvements in hydraulic fracturing systems, including improved system designs for hydraulic fracturing sites. Although examples of this disclosure are directed to hydraulic fracturing systems and are shown with reference to specific components and arrangement, concepts described herein may be applicable to other components and/or arrangements; the disclosure is not limited to the specific manifold assemblies or systems described/disclosed. Wherever possible, the same reference numbers will be used through the drawings to refer to the same or like features.

Figure 1:
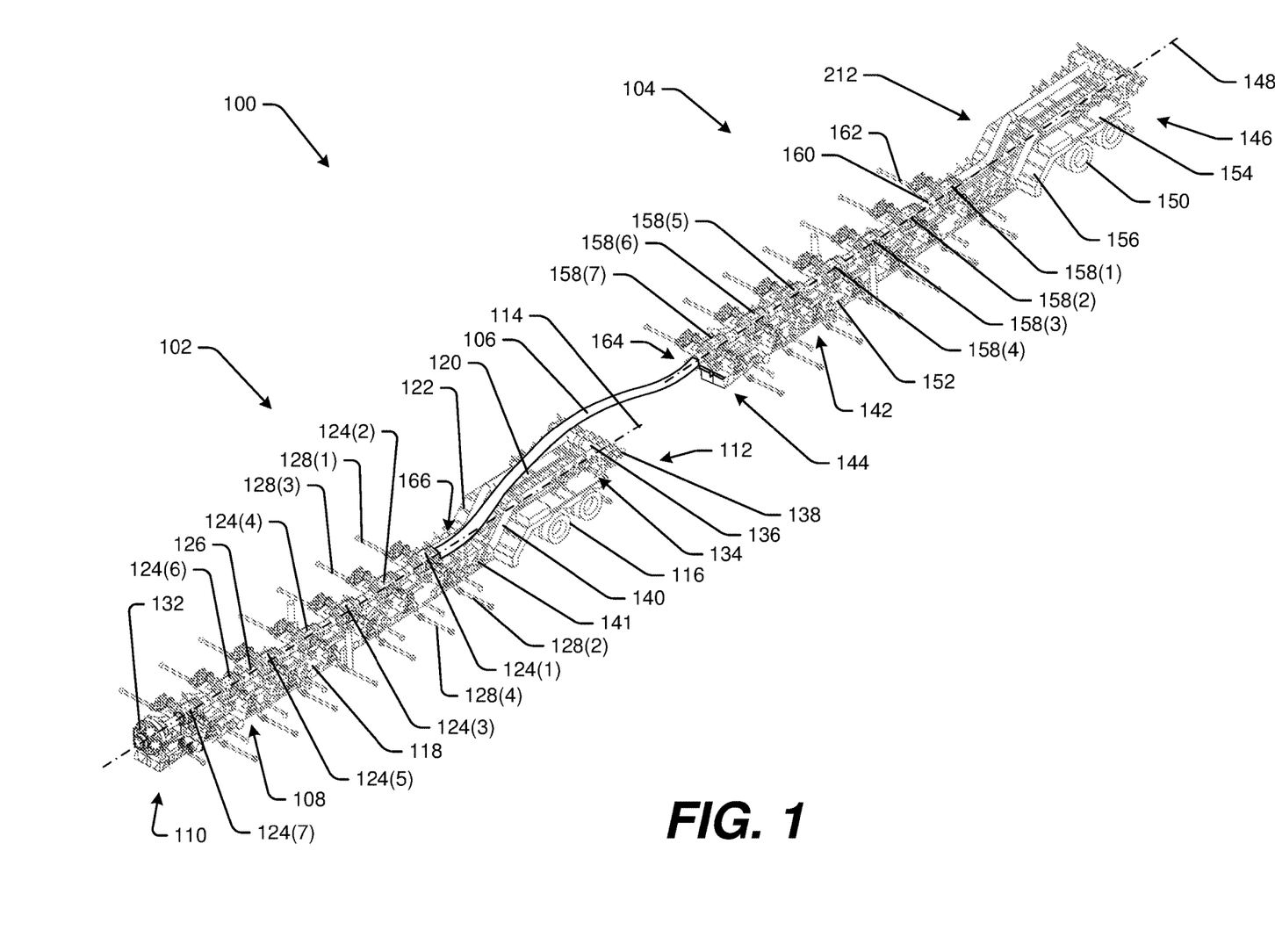
FIG. 1 is a perspective view of a hydraulic fracturing system, in accordance with an example of the present disclosure.

FIG. 1 depicts a perspective view of an example hydraulic fracturing system 100. For example, the hydraulic fracturing system 100 may be disposed at a hydraulic fracturing site. As will be appreciated, the hydraulic fracturing site will also include additional equipment that is used, along with the hydraulic fracturing system 100, during a hydraulic fracturing process. While FIG. 1 depicts some such equipment, it is to be understood that additional equipment will be necessary to conduct the hydraulic fracturing process. That additional equipment is omitted from FIG. 1 for clarity. Furthermore, certain equipment shown in FIG. 1 may be omitted in some hydraulic fracturing systems.

As mentioned previously, hydraulic fracturing is a well-stimulation technique that requires high-pressure injection of fracturing fluid into a well and corresponding wellbore in order to hydraulically fracture a rock formation surrounding the wellbore. While the description provided herein describes hydraulic fracturing in the context of wellbore stimulation for oil and gas production, it is to be understood that other uses of hydraulic fracturing are contemplated herein. For example, the hydraulic fracturing system 100 described herein may be used to stimulate groundwater wells, to dispose of waste by injection, to measure stress in the ground, to precondition and/or induce cave-ins for mining, to improve electrical generation in geothermal systems, or the like.

The hydraulic fracturing system 100 includes a first trailer 102 and a second trailer 104. More specifically, the first trailer 102 comprises a first trailer-mounted fracturing manifold, and the second trailer 104 comprises a second trailer-mounted fracturing manifold. As also illustrated in FIG. 1, the first trailer 102 and the second trailer 104 are fluidly connected by a flexible conduit 106. More specifically, and as detailed further herein, the flexible conduit 106 places the first trailer 102 and the second trailer 104 in series connection, e.g., to facilitate larger fracturing operations.

The first trailer 102 includes a trailer chassis 108 extending from a first end 110 to a second end 112, generally along an axis 114. Wheels 116 are provided proximate the second end 112 of the trailer chassis 108. Although not illustrated in FIG. 1, the trailer chassis 108 may include one or more features proximate the first end 110 to couple the trailer chassis 108 to a truck or other apparatus for moving the first trailer 102 along a ground surface. More specifically, a tractor may selectively couple to the one or more features to move the first trailer 102 via the wheels 116. In some examples, the trailer 102 and/or the trailer chassis 108 are configured to comply with transportation guidelines, e.g., including height, weight, length, and/or width restrictions, such that a tractor can haul the first trailer 102 over roads, highways, and the like.

The trailer chassis 108 includes a junction mounting surface 118 proximate the first end and extending from the from first end 110 toward the second end 112. The trailer chassis 108 also includes a raised surface 120 proximate the second end 112. The raised surface 120 is higher relative to the ground surface than the junction mounting surface 118. The raised surface 120 has a height to facilitate placement of the wheels 116 between the raised surface 120 and the ground surface. As also illustrated in FIG. 1, the trailer chassis 108 can also include a transitional section 122, between the junction mounting surface 118 and the raised surface 120. The transition section 122 is angled relative to the junction mounting surface 118 and relative to the raised surface 120. In some examples, the transition section 122 may be differently angled than in the illustration of FIG. 1.

The first trailer 102 also includes a number of components for conveying fracturing fluids to implement well-stimulation. For instance, FIG. 1 illustrates that the first trailer 102 includes a plurality of junctions 124 including a first junction 124(1), a second junction 124(2), a third junction 124(3), a fourth junction 124(4), a fifth junction 124(5), a sixth junction 124(6), and a seventh junction 124(7). Although FIG. 1 shows seven junctions 124, the first trailer 102 can include more or fewer junctions. For instance, the number of junctions 124 on the first trailer 102 may be limited by size, weight, design specifications, and/or other factors associated with the trailer chassis 108, the junctions 124, and/or other components of the first trailer 102.

The junctions 124 are aligned in series. More specifically, the junctions 124 are configured such that adjacent instances of the junctions 124 are connected by rigid conduits 126. The rigid conduits 126 may be conventional pipe segments, e.g., made of metal. The rigid conduits 126 are illustrated as straight sections that interconnect the junctions 124. As detailed further herein, the rigid conduits 126 fluidly connect the adjacent conduits, e.g., such that fluid may flow between the junctions 124.

The junctions 124 are configured to receive pressurized fluid via one or more fluid inputs, conduits, or flowlines. Herein, to avoid confusion with the rigid conduits 126, the term "flowline" is used to describe the conduits providing high-pressure fluid to the junctions 124. However, the term "flowline" and "conduit" can be used interchangeably and are intended to be synonymous. Specifically, the first junction 124(1) is illustrated as being in fluid communication with a first flowline 128(1) and a second flowline 128(2). Similarly, the second junction 124(2) is illustrated as being in fluid communication with a third flowline 128(3) and a fourth flowline 128(4). For instance, the first junction 124(1) may include two inlet ports to which the first flowline 128(1) and the second flowline 128(2) are coupled, and/or the second junction 124(2) may include two inlet ports to which the third flowline 128(3) and the fourth flowline 128(4) are coupled. Other of the junctions 124 may similarly be in fluid communication with additional flowlines. Collectively, a plurality of flowlines, which can include one or more of the first flowline 128(1), the second flowline 128(2), the third flowline 128(3), the fourth flowline 128(4), and/or one or more additional flowlines, are referred to herein as "the flowlines 128."

Although not illustrated in FIG. 1, each of the flowlines 128 may be in fluid communication with one or more pumps. That is, a first end of the flowlines 128 is coupled to one of the junctions 124 and an opposite end of the flowlines 128 is coupled to a pump. Such pumps are often disposed on one or more trailers arranged proximate the first trailer 102, e.g., for fluid connection. The specific configuration of the pump(s) may vary, and, in some instances, more than one type of pump may be used on a fracturing site. In some examples, a discrete pump may be associated with each of the flowlines 128, while in stull further examples a plurality of pumps may be associated with each of the flowlines. The pump(s) may include one or more hydraulic fracturing pump(s), which can include various types of high-volume hydraulic fracturing pumps such as triplex or quintuplex pumps. Additionally, and/or alternatively, the pump(s) may include other types of reciprocating positive-displacement pumps or gear pumps. The pump(s) required and corresponding designs thereof may vary depending on the fracture gradient of the rock formation that will be hydraulically fractured, the number of pumps used, the flow rate necessary to complete the hydraulic fracture, the pressure necessary to complete the hydraulic fracture, or the like. The hydraulic fracturing system 100 may include any number of trailers having pumps thereon to achieve a predetermined rate and pressure. The exact configuration of each pump trailer may vary from trailer to trailer and/or may vary from site to site.

As will be appreciated from the foregoing, the junctions 124 are configured to receive high-pressure fracturing fluid, e.g., via the flowlines 128. The junctions 124 and rigid conduits 126 are connected in series, as noted above. Accordingly, the junctions 124 and the rigid conduits 126 define a manifold flow path that facilitates travel of high-pressure fracturing fluid through the junctions 124. For example, the first junction 124(1) may be an initial junction and the seventh junction 124(7) may be a terminal junction with high-pressure fluid flowing from the initial junction 124(1) to the terminal junction 124(7), e.g., generally along the axis 114. In the example of FIG. 1, a fracturing head 132 is attached to the terminal junction, e.g., via another instance of the rigid conduits 126, such that the manifold flow path causes flow through the junctions 124 and into the fracturing head 132. The fracturing head 132, which is often referred to as a "goat head," receives fracturing fluid from the junctions 124 and delivers the fracturing fluid to the well (via a wellhead mounted on the well) during a hydraulic fracturing process. In some examples, the fracturing head 132 may be fluidly connected to multiple wells. During a hydraulic fracturing process, the wells may include frac trees that are installed on individual wells.

As illustrated in FIG. 1, the junctions 124 and the flowlines 128 are mounted or otherwise coupled to the junction mounting surface 118. For example, the trailer chassis 108 includes a number of different mounting surfaces, mounting holes, and/or other features for receiving and/or securing components of the first trailer 102. In some instances, the trailer chassis 108 can be fabricated from a number of metal plates, weldments, gussets, or other components.

The raised surface 120 is relatively higher, relative to a ground surface (or horizontal plane) than the junction mounting surface 118. As noted above, the raised surface 120 may be raised to accommodate the wheels 116. The raised surface 120 may also support additional components of the fracturing system 100. As illustrated in FIG. 1 a suction manifold 134, comprising a transverse pipe 136 and a plurality of inlet ports 138, is coupled to the raised surface 120, at the second end 112. Moreover, low-pressure conduits 140 extend from the transverse pipe along the raised surface 120, the transitional section 122, and a portion of junction mounting surface 118 to be in fluid communication with outlet ports 141. As is known in the art, the suction manifold 134 may receive fluid from a blender (not shown) via the inlet ports 138 and pass the fluid to the pumps for injection into the junctions 124 as discussed above. The blender may combine proppant received from a proppant storage unit with fluid received from a hydration unit.

The second trailer 104 is similar to the first trailer 102, and in some instances may be substantially identical to the first trailer 102. For example, aspects of this disclosure may be directed to arranging two (or more) trailer-mounted fracturing manifolds in series. Individual of the trailer-mounted fracturing manifolds may be configured in the same manner, e.g., as a stock or standard trailer arrangement.

In more detail, the second trailer 104 includes a trailer chassis 142 extending from a first end 144 to a second end 146, generally along an axis 148. As illustrated, the axis 148 is generally co-axial with the axis 114 of the first trailer 102. Wheels 150 are provided proximate the second end 146 of the trailer chassis 142. As with the first trailer 102, chassis 142 may include one or more features proximate the first end 144 to couple the trailer chassis 142 to a truck or other apparatus for moving the second trailer 104 along the ground. The trailer chassis 142, like the trailer chassis 108, also includes a junction mounting surface 152, a raised surface 154, and a transitional section 156, between the junction mounting surface 152 and the raised surface 154.

Also like the first trailer 102, the second trailer 104 includes a plurality of junctions 158 including a first junction 158(1), a second junction 158(2), a third junction 158(3), a fourth junction 158(4), a fifth junction 158(5), a sixth junction 158(6), and a seventh junction 158(7). Although FIG. 1 shows seven junctions 158, the second trailer 104 can include more or fewer junctions. As with the junctions 124, the junctions 158 are aligned in series, with adjacent ones of the junctions 158 being connected by rigid conduits 160. The rigid conduits 160 may be conventional pipe segments, e.g., made of metal. The rigid conduits 160 are illustrated as straight sections that interconnect the junctions 158. As detailed further herein, the rigid conduits 160 fluidly connect the adjacent conduits, e.g., such that fluid may flow between the junctions 158.

The junctions 158 function in the same manner as the junctions 124, discussed above. Specifically, the junctions 158 and the rigid conduits 160 define a manifold flow path that facilitates travel of high-pressure fracturing fluid through the junctions 158. In the illustrated example, the junctions 158 receive high-pressure fluid, via flowlines 162, from pumps (not shown). For example, the first junction 158(1) may be an initial junction and the seventh junction 158(7) may be a terminal junction, with high-pressure fluid flowing from the initial junction 158(1), through the intermediate junctions 158(2)-158(6), and to the terminal junction 158(7). Unlike the first trailer 102, the second trailer 104 does not include a fracturing head connected to the terminal junction 158(7).

Instead, in aspects of this disclosure, the terminal junction 158(7) of the second trailer 104 is fluidly connected to the initial junction 124(1) of the first trailer 102. Specifically, the flexible conduit 106 is coupled at a first end 164 to the terminal junction 158(7) on the second trailer 104 and at a second end 166 to the initial junction 124(1) on the first trailer 102. By fluidly connecting the first trailer 102 with the second trailer 104 in this manner, the trailers 102, 104 effectively form a single manifold that includes the junctions 124 and the junctions 158, terminating at the fracturing head 132.

As illustrated in FIG. 1, the axis 114 of the first trailer 102 and the axis 148 of the second trailer 104 are substantially co-axial. For example, arranging the trailers 102, 104 in this manner may accommodate placement of pump trailers, blenders, hydration sources, and/or the like, in generally conventional positions, relative to the trailers 102, 104. Moreover, this arrangement places the junctions 124 generally in line with the junctions 158, e.g., to maintain a relatively straight high-pressure fluid flow path. However, the end-to-end arrangement of the first trailer 102 and the second trailer 104 results in the wheels 116, the raised surface 120 and/or aspects of the suction manifold 134 being disposed between the terminal junction 158(7) of the second trailer 104 and the initial junction 124(1) of the first trailer 102. Because of these obstructions, the terminal junction 158(7) and the initial junction 124(1) cannot be coupled by a straight, rigid conduit, as is conventionally preferred.

Although FIG. 1 shows the axis 114 of the first trailer 102 and the axis 148 of the second trailer 104 as substantially co-axial, this disclosure is not limited to such an arrangement. For instance, and without limitation, the first trailer 102 and the second trailer 104 may be aligned such that the axis 114 and the axis 148 are substantially parallel, but offset, e.g., in a horizontal dimension and/or vertical dimension. In still further examples, the first trailer 102 and the second trailer 104 may be angled relative to each other, e.g., such that the axis 114 is angled relative to the axis 148. As will be appreciated, the flexible conduit 106 may allow for improved flexibility in arranging the first trailer 102 and the second trailer 104 at a fracturing site.

Aspects of this disclosure use the flexible conduit 106 to fluidly connect the terminal junction 158(7) and the initial junction 124(1). Specifically, and as detailed further below with reference to FIG. 2, the flexible conduit 106 is configurable to bend in a manner that configures a flow path between the terminal junction 158(7) and the initial junction 124(1) to above the raised surface 120 (and the components mounted on the raised surface 120). The use of the flexible conduit 106 may be desirable compared to a rigid connection that includes elbows or other angled connectors to provide an elevation change and straight. For example, such connections may be difficult to align, be cost prohibitive, lead to undesirable pressure losses, and/or be prone to failure, especially at non-linear sections. Instead, using a single, flexible conduit provides for a configurable solution that requires only that the first and second ends 164, 166 being coupled to the junctions.

Figure 2:
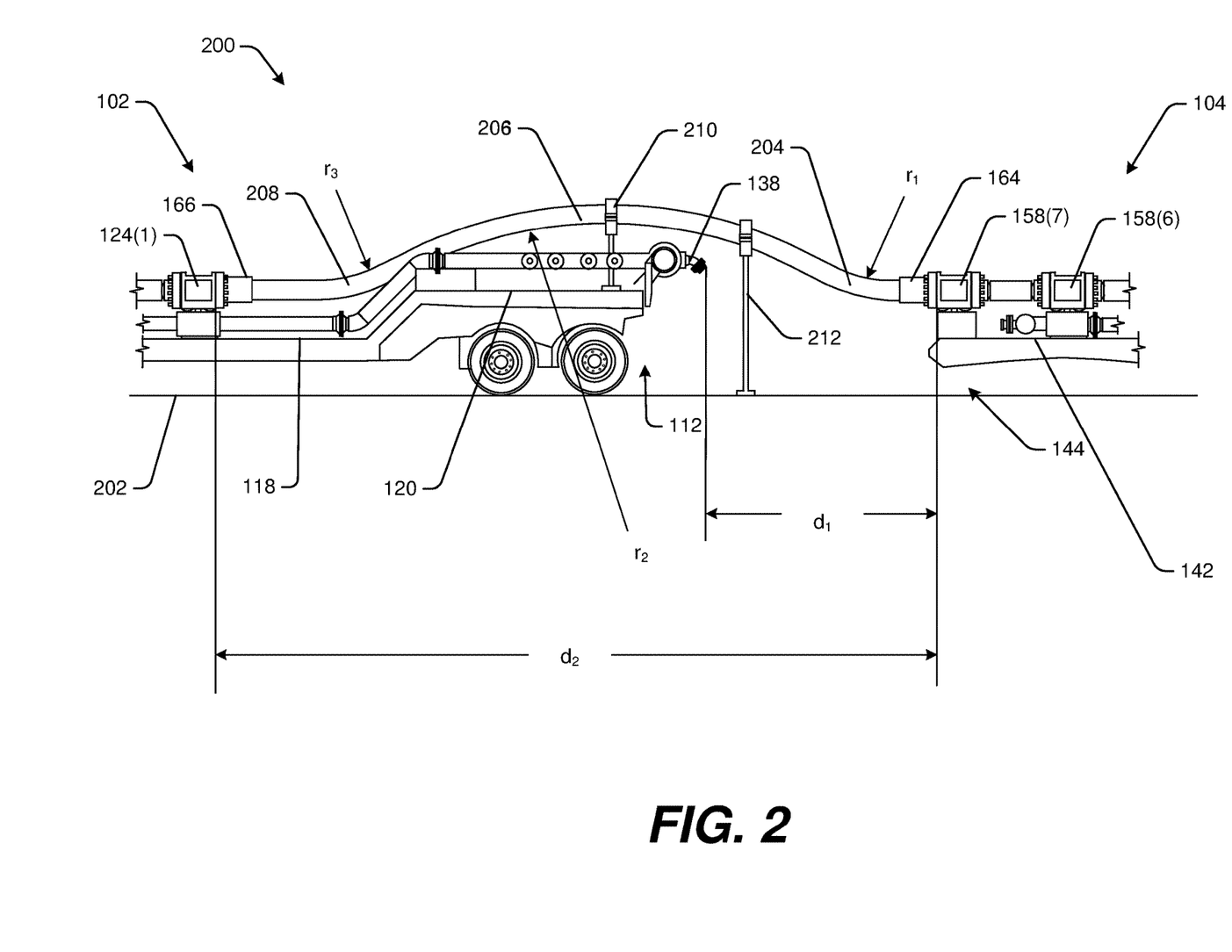
FIG. 2 is a partial side view of the example hydraulic fracturing system of FIG. 1, in accordance with an example of the present disclosure.

FIG. 2 is a side view of a section 200 of the hydraulic fracturing system 100. In FIG. 2, the same reference numerals used in FIG. 1, and discussed above, are used to identify the same features. Specifically, the section 200 of FIG. 2 includes a portion of the first trailer 102 proximate the second end 112 thereof, including the raised surface 120, a segment of the junction mounting surface 118, and the initial junction 124(1). The section 200 also includes a portion of the second trailer 104, proximate the first end 144 thereof, including a segment of the junction mounting surface 152 and the terminal junction 158(7). The section 200 also illustrates the flexible conduit 106 extending between, and coupled to, the initial junction 124(1) of the first trailer 102 and the terminal junction 158(7) of the second trailer 104.

FIG. 2 illustrates the elevational, e.g., height, variations of the various components of the hydraulic fracturing system 100. Specifically, FIG. 2 shows the junction mounting surface 118 and the raised surface 120 of the first trailer 102 and the junction mounting surface 142 of the second trailer 104, e.g., relative to a ground surface 202. The ground surface 202 is shown as horizontal, for illustration only. As shown, the junction mounting surface 118 and the junction mounting surface 142 are substantially coplanar, e.g., such that the junctions 124 and the junctions 158 are disposed at the same height relative to the ground surface 202. However, in other implementations, the junction mounting surfaces 118, 152 may be disposed at different heights.

FIG. 2 also shows the elevation change of the flexible conduit 106. In the example of FIG. 2, the flexible conduit 106 is secured at the first end 164 to the terminal junction 158(7) on the second trailer 104 at a first height. Proximate the first end 164, the flexible conduit 106 includes a first end section 204 that bends up (e.g., relative to the ground surface 202). The first end section 204 has a first bend radius, $r_1$. Adjacent the first end section 204 is an intermediate section 206. The intermediate section 206 is illustrated as generally arcuate, having a second bend radius $r_2$. A second end section 208 is adjacent the intermediate section 206, proximate the second end 166 of the flexible conduit 106. As illustrated, the second end section 208 has a third bend radius, $r_3$, that transitions from the intermediate section 206 to the terminal junction 158(7) of the second trailer 104.

In examples, the first bend radius, $r_1$, and the third bend radius, $r_3$, may be substantially the same. For example, the first bend radius, $r_1$, and the third bend radius, $r_3$, may be on the order of a minimum of about 65 to 70 inches or greater. The second bend radius, $r_2$, may be substantially larger, e.g., on the order of about 240 inches or more. As will be appreciated from the example of FIG. 2, the intermediate section 206 is substantially longer than the first end section 204 and the second end section 208, so the second bend radius may also be significantly larger. As noted, the bend radii may be minimum bend radii, e.g., to reduce an overall height of the flexible conduit 106 and/or to minimize abrupt directional changes that may impact flow of the high-pressure fracturing fluid therein. For example, the first and third bend radii may be minimum bend radii to provide a trajectory for the flexible conduit 106 to be positioned only slightly above the raised surface 120 and components disposed thereon. Minimizing the first and third bend radii may be desirable to maintain a desired flow of high-pressure fracturing fluid passing from the terminal junction 158(7) to the initial junction 124(1).

FIG. 2 also illustrates a first conduit mount 210 and a second conduit mount 212. Specifically, the first conduit mount 210 is configured to be mounted to the raised surface 120 and to maintain the flexible conduit 106 in a desired position above the raised surface 120. The second conduit mount 212 is similarly configured to maintain the flexible conduit 106 in a desired position, but the second conduit mount 212 is mounted on the ground surface 202. The conduit mounts 210, 212 are illustrated as supporting the flexible conduit 106 at different positions along the length of the conduit. In the example, both the first conduit mount 210 and the second conduit mount 212 contact the intermediate section 206 of the flexible conduit 106, although the conduit mounts 210, 212 (and/or additional or alternative conduit mounts) may be provided at other positions along the length of the flexible conduit 106. An example of the flexible conduit mounts 210, 212 is detailed further below, with reference to FIG. 4.

In FIG. 2, the first trailer 102 and the second trailer 104 may be spaced a first distance, $d_1$, e.g., a distance between the inlet ports 170 and the terminal junction 158(7). This spacing may position the terminal junction 158(7) a second distance, $d_2$, from the initial junction 124(1). In examples, the first distance, $d_1$, may be on the order of about 12 feet to about 15 feet, which may provide adequate clearance for access to components of the first trailer 102 and/or second trailer 104, e.g., access by operators, mechanics, machinery, or the like. The first distance may also be selected to provide clearance for additional components, including but not limited to conduits or flowlines connected to the inlet ports 170, or the like. Also in examples, the second distance, $d_2$, may be on the order of about 30-40 feet. Accordingly, the flexible conduit 106 may also have a linear length of about 400 inches or more.

Figure 3:
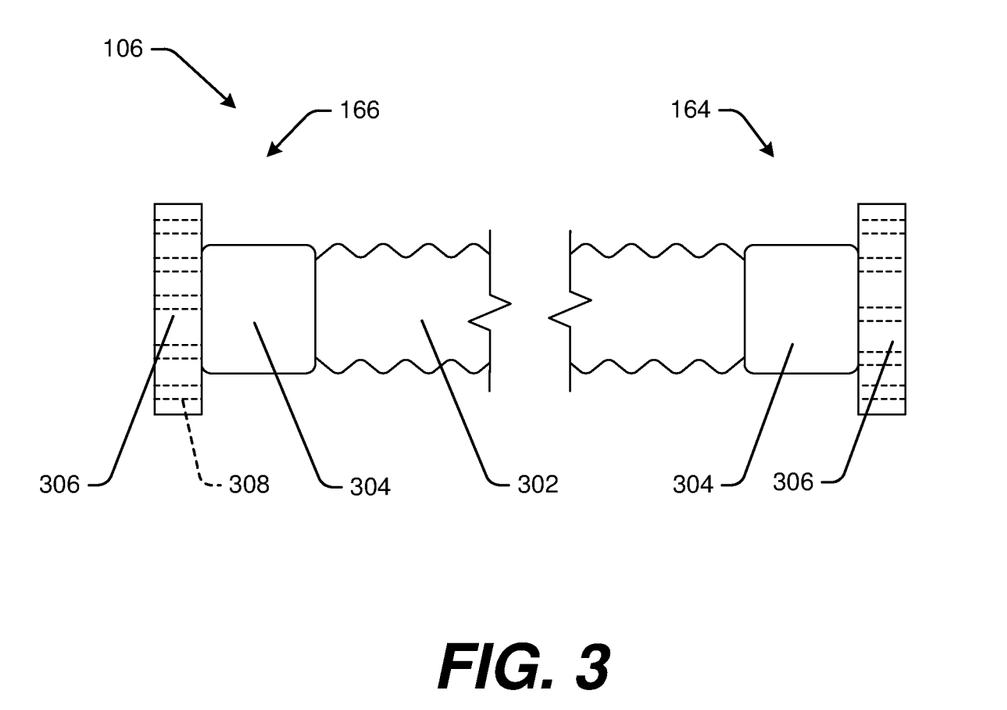
FIG. 3 is an illustration of an example flexible conduit for use in the example hydraulic fracturing system of FIG. 1, in accordance with an example of the present disclosure.

FIG. 3 illustrates the flexible conduit 106 in more detail. As shown, the flexible conduit 106 includes a hose 302, which may be formed of a composite material, e.g., a composite polymer. The hose 302 defines a bore through which the high-pressure fracturing fluid passes. For instance, the hose 302 may define a bore on the order of about 2 inches or more and may be rated for fluid up to about 15,000 psi. As noted above, the length of the hose 302 may vary, e.g., depending on the application. In the example hydraulic fracturing system 100, the hose 302 may be about 35 feet or more.

Figure 4:
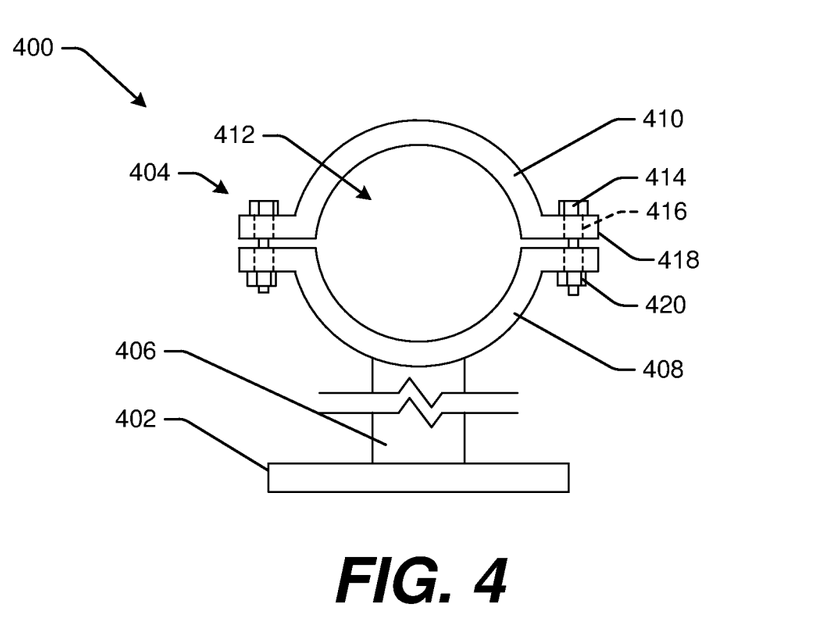
FIG. 4 is an illustration of an example flexible conduit mount for use in the example fracturing system of FIG. 1, in accordance with an example of the present disclosure.

FIG. 4 illustrates an example flexible conduit mount 400. The flexible conduit mount 400 may be the first conduit mount 210 or the second conduit mount 212, for example. The flexible conduit mount 400 is configured to retain the flexible conduit 106 at a desired position, e.g., a desired height, as discussed above with reference to FIG. 2. The flexible conduit mount 400 may be substantially robust to retain the flexible conduit 106 in the desired position, even though the flexible conduit 106 may weigh on the order of about 90 pounds per foot, and may experience flow rates of over 10,000 psi. The flexible conduit mount 400 is for example only, as other mounts and/or arrangements may be used to retain the flexible conduit 106 at the desired position.

As shown in FIG. 4, the flexible conduit mount 400 includes a base 402 and a collar 404 spaced from the base 402 by a post 406. In some examples, the base 402 may be configured for securement to a mounting surface. The mounting surface may be the raised surface 120, the ground surface 202, or some other surface. For example, the base 402 may have a number of holes (not shown) formed therethrough and through which fasteners, such as threaded fasteners, can be passed for threading to the mounting surface. The post 406 may be sized based on the application. For example, the post 406 may have a height that places the collar 404 at a desired height relative to the ground surface 202, the raised surface 120, or the like. In examples, the base 402 may be a metal plate and the post 406 may be a metal rod, beam, or other rigid structure. For instance, the post 406 may be welded to the base 402. Moreover, and although not illustrated in FIG. 4, gussets or the like may be provided to strengthen the mount 400.

The collar 404 is supported by the post and generally includes a lower arcuate section 408 and an upper arcuate section 410. The lower arcuate section 408 and the upper arcuate section 410 align as shown in FIG. 4 to form an opening 412 sized to receive the flexible conduit 106 therein. Threaded fasteners 414, e.g., bolts, pass through holes 416 in ears 418 of the arcuate sections 410 and nuts 420 are threaded onto the threaded fasteners 414. As will be appreciated, tightening the nuts 420 on the threaded fasteners 414 will selectively reduce the size of the opening 412, e.g., to clamp an outer surface of the flexible conduit 106.

Modifications to the flexible conduit mount 400 also are contemplated. For example, and without limitation, the post 406 may incorporate a height-adjustment feature. For instance, the post 406 may comprise two portions moveable relative to each other, e.g., via mating threads, a sliding arrangement, or the like. The height-adjustment feature may facilitate on-site adjustments of the collar 404, thereby allowing for controlled positioning of the flexible conduit 106. Moreover, although the example of FIG. 4 shows the nuts 420 and bolts to adjust the collar 404, e.g., by moving the upper arcuate section 410 relative to the lower arcuate section 408, other arrangements will be appreciated by those having ordinary skill in the art, with the benefit of this disclosure. For instance, the collar 404 may incorporate clamps, levers, or the like, to secure the flexible conduit 106.

Figure 5:
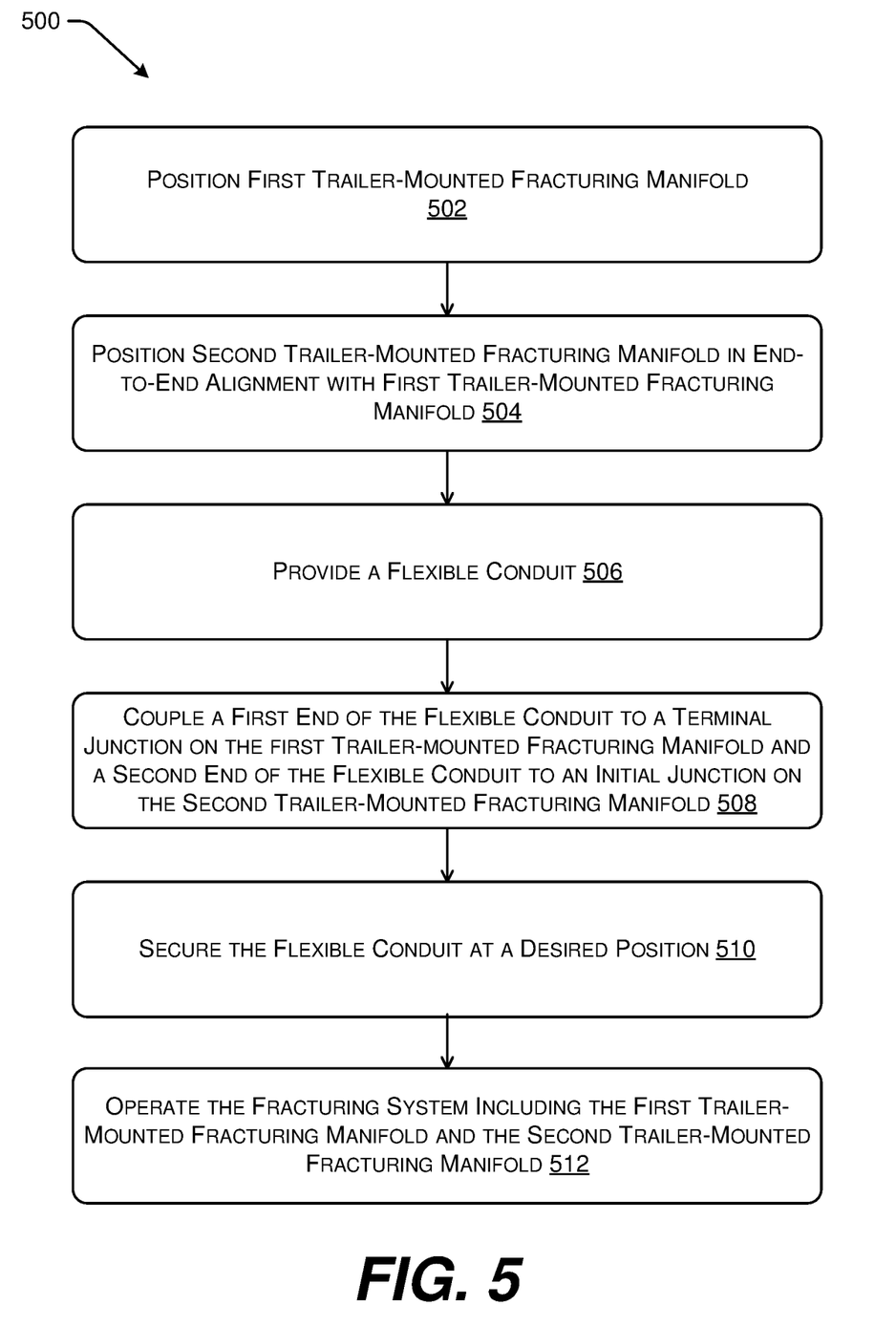
FIG. 5 is flow chart demonstrating an example method of configuring a hydraulic fracturing system an example hydraulic fracturing manifold shown in a second configuration, in accordance with an example of the present disclosure.

FIG. 5 illustrates an exemplary process 500 for configuring a fracturing system, such as the hydraulic fracturing system 100. While FIG. 5 describes steps for configuring the hydraulic fracturing system 100, the process 500 may be carried out in an order different than that shown and described.

With reference to FIG. 5, at an operation 502, the process 500 includes positioning a first trailer-mounted fracturing manifold. For instance, the trailer-mounted fracturing manifold may be the first trailer 102 or the second trailer 104 discussed above, including the junctions 124, 158 and terminating at the fracturing head 132. A tractor or other machinery may be used to position the trailer-mounted fracturing manifold at an appropriate position at a fracturing site. Once positioned, the tractor may be de-coupled from the trailer-mounted fracturing manifold, and aspects of the manifold may be configured. Without limitation, the junctions 124, 158 may be coupled to pumps, and/or the fracturing head 132 may be coupled to conduits in fluid communication with a well bore.

At an operation 504, the process 500 includes positioning a second trailer-mounted fracturing manifold in end-to-end alignment with the first trailer-mounted fracturing manifold. The second trailer-mounted fracturing manifold may be the second trailer 104 or the first trailer 102. In practice, because the trailers 102, 104 may be coupled to a tractor proximate their respective first ends 110, 144, the second trailer 104 may be positioned first at the operation 502, the tractor may be decoupled and moved away from the second trailer 104, and the first trailer 102 may be positioned with its second end 112 arranged proximate the first end 144 of the second trailer 104. In this arrangement, the axis 114 of the first trailer 102 may be substantially co-axial with the axis 148 of the second trailer 104. However, co-axial may not be required. For instance, because the first trailer 102 and the second trailer 104 are to be connected by the flexible conduit 106, the flexible conduit 106 may be configured to provide some angular or lateral offset of the axes 114, 148.

At an operation 506, the process 500 includes providing a flexible conduit, and at an operation 508, the process 500 includes coupling a first end of the flexible conduit to a terminal junction on the first trailer-mounted fracturing manifold and a second end of the flexible conduit to an initial junction on the second trailer-mounted fracturing manifold. The flexible conduit may be the flexible conduit 106 discussed above. The first end 164 of the flexible conduit 106 is coupled to the terminal junction 158(7) on the second trailer 104, and the second end 166 of the flexible conduit 106 is coupled to the initial junction 124(1) of the first trailer 102. As shown in FIG. 3, the flexible conduit 106 can include flanged fittings at its ends 164, 166, which are securable to mounting surfaces on the junctions to place the flexible conduit 106 in fluid communication with the terminal junction 158(7) and the initial junction 124(1). With this arrangement, the first trailer-mounted fracturing manifold and the second trailer-mounted fracturing manifold are placed in series.

At an operation 510, the process 500 may also include securing the flexible conduit at a desired position. The flexible conduit 106 may be desirable for its ability to provide a reliable fluid connection of the first trailer-mounted fracturing manifold and the second trailer-mounted fracturing manifold even when a direct, e.g., straight, connection is not possible. In the examples discussed above, the flexible conduit 106 is configured to pass over the raised surface 120 of the trailer chassis 108 and components thereon. Unlike iron solutions, the flexible conduit 106 may require only two connections, e.g., at the terminal junction 158(7) and the initial junction 124(1). The flexible conduit 106 may require mounting or securing along its length, however. Thus, for example, FIG. 2 shows conduit mounts 210, 212, and FIG. 4 shows a flexible conduit mount 400, which may be used to secure the flexible conduit 106 in a desired position/configuration at the operation 510. In some instances, portions of the flexible conduit 106 can be held in place by a crane or other machine, for coupling of the ends of the flexible conduit 106 to the junctions 124(1), 158(7) at the operation 508, and for securing by the mounts 210, 212, 400, at the operation 510.

At an operation 512, the process 500 also includes operating the fracturing system. With the first trailer-mounted fracturing manifold and the second trailer-mounted fracturing manifold connected in series by the flexible conduit 106, high pressure fracturing fluid may be supplied to the junctions 124, 158, e.g., by the flowlines 128, 162. The fracturing fluid passes through the junctions 124, 158 in a flow direction from the initial junction 158(1) of the junctions 158 on the second trailer 104, through the remaining junctions 158(2)-158(7), through the flexible conduit 106, through the junctions 124(1)-124(7) on the first trailer 102, and to the fracturing head 132. According to this arrangement, two trailer-mounted fracturing manifolds are connected in series, to provide the fracturing system 100 with increased pressures and flow rates.

INDUSTRIAL APPLICABILITY

The present disclosure describes a hydraulic fracturing system 100 (or other fluid pump system) that includes multiple trailer fracturing manifolds. The hydraulic fracturing system 100 described herein uses conventional trailer-mounted manifold systems to provide a composite system with increased flow rate that is easily configured, thereby reducing the overall cost of setup and maintenance of the system. In examples, the hydraulic fracturing system 100 includes a first trailer 102 having a plurality of first junctions 124 arranged thereon and a second trailer 104 having a plurality of second junctions 158 arranged thereon. The first trailer 102 and the second trailer 104 are arranged end-to-end, such that the axis 114 of the first trailer 102 is generally aligned with the axis 148 of the second trailer 104. A flexible conduit 106 is connected at a first end 164 to a terminal junction 158(7) of the second junctions 158 and at a second end 166 to an initial junction 124(1) of the first junctions 124. The flexible conduit 106 places the first junctions 124 in series with the second junctions 158, thereby providing a larger, composite manifold as the fracturing system 100.

Because of this arrangement, the hydraulic fracturing system 100 described herein provides a number of benefits. For instance, the hydraulic fracturing system 100 increases a greater range of flow rates that the hydraulic fracturing system 100 may provide during hydraulic fracturing (or other pump processes). Furthermore, the flexible conduit 106 may be configured relative to existing obstacles between the terminal junction 158(7) and the initial junction 124(1), which may be present in conventional trailer-mounted systems.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A fracturing system, comprising:
    a first trailer comprising:
        first wheels for transporting the first trailer over a ground surface,
        a first trailer chassis extending from a first end to a second end, the first trailer chassis comprising a first junction mounting surface, extending from the first end toward the second end, the first wheels being disposed proximate the second end,
        a plurality of first junctions fluidly connected via first rigid conduits and coupled to the first junction mounting surface, the plurality of first junctions including, in series, a first initial junction proximate the first wheels, at least one first intermediate junction, and a first terminal junction proximate the first end, the first initial junction, the at least one first intermediate junction, and the first terminal junction being connected via first rigid conduits;
    a second trailer comprising:
        a second trailer chassis extending from a third end to a fourth end, the second trailer chassis comprising a second junction mounting surface, and
        a plurality of second junctions fluidly connected via second rigid conduits and coupled to the second junction mounting surface, the plurality of second junctions including, in series, a second initial junction, at least one second intermediate junction, and a second terminal junction proximate the third end of the second trailer chassis, the second initial junction, the at least one second intermediate junction, and the second terminal junction being connected via second rigid conduits;
    a flexible conduit fluidly connecting the first initial junction to the second terminal junction and configured to convey high-pressure fracturing fluid from the second terminal junction to the first initial junction to place the plurality of first junctions in series with the plurality of second junctions, the high-pressure fracturing fluid having pressure ranging from 10,000 psi to 15,000 psi, the flexible conduit comprising an intermediate segment; and
    a flexible conduit support comprising a lower arcuate member and an upper arcuate member, the lower arcuate member and the upper arcuate member being coupled to form an opening, wherein the intermediate segment is disposed in the opening, between the lower arcuate member and the upper arcuate member.

2. The fracturing system of claim 1, wherein:
    the first trailer chassis extends along a first axis from the first end to the second end;
    the second trailer chassis extends along a second axis from the third end to the fourth end; and
    the first trailer and the second trailer are arranged with the first axis substantially co-axial with the second axis.

3. The fracturing system of claim 2, wherein:
the plurality of first junctions are aligned substantially along the first axis; and
the plurality of second junctions are aligned substantially along the second axis.

4. The fracturing system of claim 1, wherein the flexible conduit further comprises:
a first flexible conduit end configured to be coupled to the first initial junction, and
a second flexible conduit end configured to be coupled to the second terminal junction,
wherein the intermediate segment comprises a polymeric material configured to bend relative to the first flexible conduit end and the second flexible conduit end.

5. The fracturing system of claim 4, wherein:
the first trailer chassis comprises a raised surface, higher than the first junction mounting surface relative to the ground surface, proximate the second end of the first trailer chassis; and
a portion of the intermediate segment is disposed at an elevation above the raised surface and above the first flexible conduit end and the second flexible conduit end.

6. The fracturing system of claim 5, wherein the flexible conduit support is coupled to the raised surface and configured to contact the intermediate segment to retain the portion of the intermediate segment at the elevation.

7. The fracturing system of claim 4, wherein:
the flexible conduit has a first radius proximate the first flexible conduit end of between about 70 inches and about 80 inches;
the flexible conduit has a second radius proximate the second flexible conduit end of between about 70 inches and about 80 inches; and
the flexible conduit has a third radius at the intermediate segment of between about 225 inches and about 275 inches.

8. The fracturing system of claim 1, further comprising:
a fracturing head fluidly connected to the first terminal junction, the second trailer being free of a fracturing head.

9. A fracturing system comprising:
a first trailer including a first trailer chassis and a plurality of first junctions disposed on the first trailer chassis, the plurality of first junctions being connected in series via first rigid conduits and comprising a first initial junction, at least one first intermediate junction, and a first terminal junction, individual of the plurality of first junctions being configured to receive high-pressure fracturing fluid from a fracturing pump via a high-pressure flow line, the high-pressure fracturing fluid having pressure ranging from 10,000 psi to 15,000 psi;
a second trailer including a second trailer chassis and one or more second junctions disposed on the second trailer, the one or more second junctions including a second terminal junction;
a flexible conduit comprising an intermediate segment and fluidly connecting the first initial junction to the second terminal junction to convey the high-pressure fracturing fluid; and
a conduit support comprising a lower arcuate member and an upper arcuate member, the lower arcuate member and the upper arcuate member being coupled to form an opening, wherein the intermediate segment is disposed in the opening, between the lower arcuate member and the upper arcuate member.

10. The fracturing system of claim 9, wherein:
the first trailer extends along a first axis,
the second trailer extends along a second axis; and
the first trailer and the second trailer are aligned end-to-end, such that the first axis and the second axis are substantially co-axial.

11. The fracturing system of claim 10, wherein:
the first trailer includes a first end spaced from a second end in a first direction along the first axis;
the second trailer includes a third end spaced from a fourth end in a second direction along the second axis; and
the second end of the first trailer faces the third end of the second trailer.

12. The fracturing system of claim 11, wherein:
the first trailer chassis comprises a first junction mounting surface, extending from the first end toward the second end, and a raised surface at the second end, the raised surface being higher than the first junction mounting surface relative to a ground surface;
the plurality of first junctions are coupled to the first junction mounting surface; and
the first trailer further comprises a plurality of wheels coupled to the first trailer chassis at a position between the raised surface and a ground surface.

13. The fracturing system of claim 12, wherein the flexible conduit further comprises:
a first flexible conduit end configured to be coupled to the first initial junction, and
a second flexible conduit end configured to be coupled to the second terminal junction,
wherein the intermediate segment comprises a polymeric material configured to bend relative to the first flexible conduit end and the second flexible conduit end.

14. The fracturing system of claim 13, wherein a portion of the intermediate segment is disposed at an elevation above the raised surface and above the first flexible conduit end and the second flexible conduit end.

15. The fracturing system of claim 14, wherein the conduit support is coupled to the raised surface and configured to contact the intermediate segment to retain the portion of the intermediate segment at the elevation.

16. A method of configuring a fracturing system, the method comprising:
providing a first trailer including a first trailer chassis and a plurality of first junctions arranged in series;
aligning a second trailer with the first trailer, the second trailer including a second trailer chassis and a plurality of second junctions arranged in series;
providing a flexible conduit, the flexible conduit comprising an intermediate segment;
securing the intermediate segment with a conduit support comprising a lower arcuate member and an upper arcuate member, the lower arcuate member and the upper arcuate member being coupled to form an opening, the intermediate segment being disposed in the opening between the lower arcuate member and the upper arcuate member; and
coupling a first end of the flexible conduit to a terminal junction of the plurality of second junctions and a second end of the flexible conduit to an initial junction of the plurality of first junctions to place the plurality of first junctions in series with the plurality of second junctions for conveying high-pressure fracturing fluid having pressure ranging from 10,000 psi to 15,000 psi.

17. The method of claim 16, wherein securing the intermediate segment with the conduit support includes:

securing the intermediate segment above a raised portion of the first trailer chassis proximate an end of the first trailer chassis facing the second trailer chassis.

18. The method of claim 16, wherein:

the first trailer chassis extends along a first axis from a first end to a second end;

the second trailer chassis extends along a second axis from a third end to a fourth end; and the aligning the second trailer with the first trailer comprises aligning the first axis with the second axis with the second end of the first trailer chassis facing the third end of the second trailer chassis.

\* \* \* \* \*